April 30, 1963 G. W. HILL ET AL 3,087,644
CLOSURE PLATE FOR AIRPLANE SPRAY TANK
Filed Feb. 6, 1962
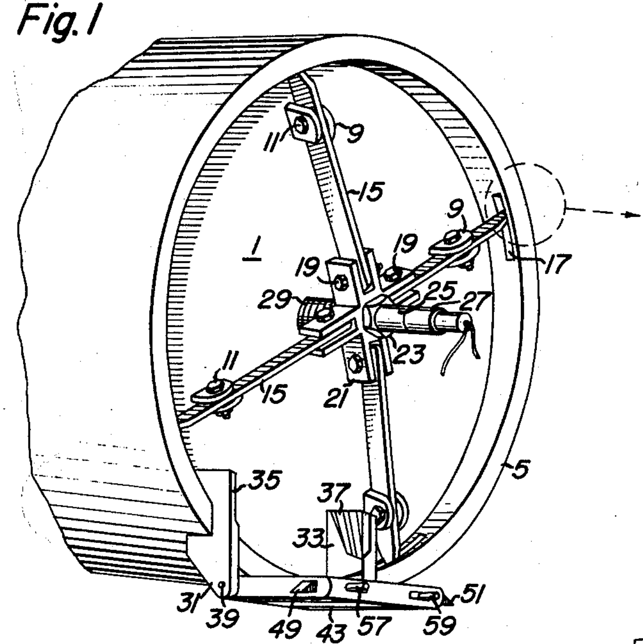
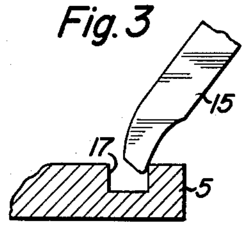
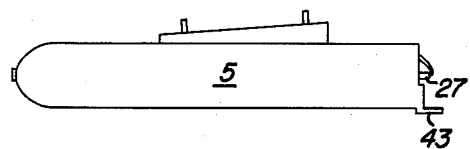
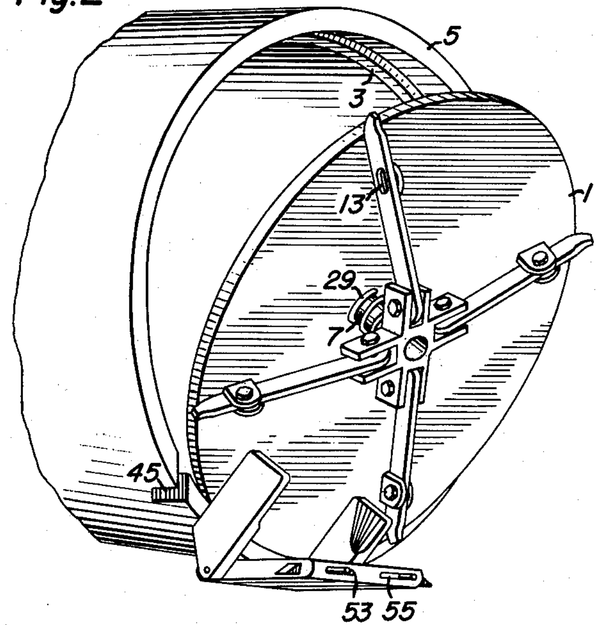
Fig. 5 37
INVENTORS
George W. Hill
Vincent C. Little
BY George Renkon
ATTORNEY United States Patent Office 3,087,644

Patented Apr. 30, 1963

3,087,644

CLOSURE PLATE FOR AIRPLANE SPRAY TANK

George W. Hill and Vincent C. Little, Baltimore, Md., assignors to the United States of America as represented by the Secretary of the Army Filed Feb. 6, 1962, Ser. No. 171,539
3 Claims. (Cl. 220—57)
(Granted under Title 35, U.S. Code (1952), sec. 266)

The invention described herein may be manufactured and used by or for the Government of the United States of America for governmental purposes without the payment to us of any royalty thereon.

This invention relates to a closure plate and securing and releasing means therefor.

The closure plate herein described is principally used in connection with an airplane spray tank, which generally is suspended from a wing of the aircraft.

Conjunctionally, our device may be used in such instances, as for an example, the dissemination of biological agents or in any other situation when the spraying technique by military aircraft is desirable.

In civil use, our device may be employed in spray tanks, carried by an aircraft, in situations such as spraying insecticides, spraying forest fires with the extinguishing compositions, etc.

The primary object of the invention is the provision of a closure plate of the character which employs a quick release and a locking means thereon, adapted to release and hold said closure plate in an open position thereby retaining same for future reuse. The latter feature is the most important, since in past designs, the closure plate was discharged with the agent. This sometimes resulted in damage to the aircraft.

It is to be noted here, that an explosive bolt utilized in our device, and shown in the drawing, is hereby disclaimed. This item, having been designated EX-3MOD-1, has been developed by the Naval Weapons Laboratory, Dahlgren, Virginia.

In the accompanying drawings,

FIG. 1 is a perspective view, showing our device in closed position.

FIG. 2 is a perspective view, showing our device in a partially opened position.

FIG. 3 is a fragmentary enlarged view, showing the engagement of a lever.

FIG. 4 is a diagrammatic view of the spray tank, showing the relative position of our device.

FIG. 5 is a sectional enlarged view of a ratchet.

Referring more in detail to the drawing of our device, which generally is made of metal; 1 designates the closure plate. In closed position, the latter fits tightly against resilient gasket 3 of spray tank 5, thereby creating a fluid tight seal. On the outer surface of the closure plate, there is centrally located, and rigidly welded, an interiorly threaded hub 7. On this same plate, there are radially located and rigidly welded, lever brackets 9. Said brackets, through means of bolts 11, pivotably engage levers 15 through elongated slots 13. The outer ends of the levers 15 are so shaped that at assembly, they fit or properly engage arcuate slots 17 of spray tank 5 as is illustrated in FIG. 3. The inner ends of the levers 15, are through means of bolts 19, pivotably engaged in a central cross lever bracket 21. Said central cross lever bracket embodies an explosive bolt 23, referred to earlier in the introduction of the disclosure. This bolt at its head portion, contains adapter 25, having detonator 27, while its leg portion being surrounded by an expansion spring 29, is screwed into hub 7. This joining action which takes place at the assembly stage, creates a solid connection or union between the cross lever brackets 21, and the closure plate 1. The cooperation of this embodiment will later be described.

The closure plate 1, at the lower outer surface, has rigidly welded onto it vertical brackets 31 and 33, having ratchets 35 and 37. The brackets 31, 33 at their lower ends are pivotally connected by pins 39 and 41 (pin 41 is not shown) to a support plate 43, and are freely seated in cut-outs 45 and 47 (cut-out 47 is not shown) of the spray tank 5. The support plate 43 at its side edges has protruding spring actuated slideable keepers 49 and 51, while at the front edge, protruding from slots 53 and 55, it has pins 57 and 59 which are fixed into the keepers 49 and 51 to enable the keepers to be pulled back.

In operation, the explosive bolt 23 is electrically fired and broken away from hub 7, thereby splitting the solid connection or union. At this occurrence, simultaneously, a glass plate (not shown) at the front of the spray tank is detonated and shattered, allowing the in-rushing air and the shattered glass to enter the spray tank. (The detonation principle used herein is similar to that which is used in patent to Goddard et al. No. 2,408,774, or to any other well known similar principle.)

The central cross lever bracket 21, engaging the inner ends of the lever 15 (now free from the hub 7), is pushed backward, disengaging the outer ends of said levers 15 from the arcuate slots 17 of the spray tank 5. The backward pushing action of the closure plate 1 to an open position is brought about by the expansion spring 29 and the internal pressure created by the in-rushing air through the spray tank.

The downward arcuate travel of the closure plate, at the horizontal position, is intercepted through its keepers 49, 51 engaging the ratchets 35, 37. The closure plate here can lock in three positions; horizontal, 7½° below horizontal, and 15° below horizontal. These three locking positions provide for unrestricted flow of the agent from the tank (allowing the maximum spraying yield), and prevent the closure plate (while in flight) from flapping which would cause the agent to come out in puffs, rather than the required streams.

To release the closure plate from its open position (while the aircraft is grounded), the operator presses inward the pins 57, 59 thereby retracting the keepers 49, 51. This action will free the closure plate, permitting it now to be moved back to its closed position.

After removing the broken portion of the explosive bolt, the operator replaces same with a new unit thereby readying the device for a new operation.

Having thus described our invention, what we claim as new therein and desire to secure by Letters Patent is:

1. A closure plate in combination with a spray tank comprising:
   - a gasket mounted inside of said spray tank spaced from the end thereof adapted to cooperate with said closure plate;
   - a plurality of arcuate slots on the inside of said spray tank equally spaced from and parallel to said gasket;
   - a closure plate pivotally attached to said spray tank at the end thereof;
   - explosive releasing means supported on said closure plate adapted to cooperate with said slots;
   - locking means mounted on said tank adapted to engage and retain said closure plate in an open position.

2. A closure plate in combination with a spray tank comprising:
   - a gasket mounted inside said spray tank spaced from the end thereof adapted to cooperate with said closure plate;
   - a plurality of arcuate slots on the inside of said spray tank equally spaced from and parallel to said gasket;

a closure plate pivotally attached to said spray tank at the end thereof;

locking means mounted on said tank adapted to engage and retain said closure plate in an open position;

explosive releasing means supported on said closure plate consisting of;

a centrally located cross lever bracket;

a plurality of bolt-pivoted levers, extending from said cross lever bracket, having elongated slots therein and the outer ends so shaped that they properly fit and engage into said slots of said spray tank;

a plurality of lever brackets located between said cross lever bracket and said tank;

a hub, having interior threads therein, mounted in the center of said closure plate;

an explosive bolt in said hub adapted to normally hold said cross lever bracket to said hub;

an expansion spring, surrounding said hub, adapted for the purpose of pushing said cross lever bracket outward upon the firing of said explosive bolt, said outward pushing of the cross lever bracket resulting in the disengagement of the outer ends of the levers from the plurality of slots of the spray tank, thereby freeing the closure plate and permitting it to be brought into an open position.

3. A closure plate in combination with a spray tank comprising:

a gasket mounted inside of said spray tank spaced from the end thereof adapted to cooperate with said closure plate;

a plurality of arcuate slots on the inside of said spray tank equally spaced from and parallel to said gasket;

a closure plate pivotally attached to said spray tank at the end thereof;

explosive releasing means supported on said closure plate adapted to cooperate with said slots;

locking means mounted on said tank comprising;

a pair of vertical brackets having ratchets thereon mounted on said closure plate;

a support plate, mounted on the exterior of said tank, having slideable keepers and pins therein, adapted to engage the ratchets of said vertical brackets, thereby locking and retaining said closure plate.

References Cited in the file of this patent

UNITED STATES PATENTS

| | | |
|---|---|---|
| 1,320,729 | Boe | Nov. 4, 1919 |
| 1,966,851 | Dean | July 17, 1934 |
| 2,955,452 | Myers | Oct. 11, 1960 |